United States Patent
Lin et al.

(10) Patent No.: US 8,258,460 B2
(45) Date of Patent: Sep. 4, 2012

(54) TRANSMISSIVE OPTICAL ENCODER

(75) Inventors: Hui-Chin Lin, Houli Township, Taichung County (TW); Chun-Chih Liang, Taipei (TW)

(73) Assignee: Everlight Electronics Co., Ltd., New Taipei (TW)

( * ) Notice: Subject to any disclaimer, the term of this patent is extended or adjusted under 35 U.S.C. 154(b) by 289 days.

(21) Appl. No.: 12/621,953

(22) Filed: Nov. 19, 2009

(65) Prior Publication Data

US 2010/0123071 A1   May 20, 2010

(30) Foreign Application Priority Data

Nov. 19, 2008   (TW) ................................ 97144691 A

(51) Int. Cl.
*G01D 5/34* (2006.01)
(52) U.S. Cl. .................. 250/239; 250/231.13
(58) Field of Classification Search .................. 250/239, 250/231.13–231.18
See application file for complete search history.

(56) References Cited

U.S. PATENT DOCUMENTS

| | | | | | |
|---|---|---|---|---|---|
| 5,567,953 | A | * | 10/1996 | Horinouchi et al. | 250/551 |
| 5,811,797 | A | * | 9/1998 | Kobachi et al. | 250/239 |
| 7,279,674 | B2 | * | 10/2007 | Ng et al. | 250/231.13 |
| 7,589,317 | B2 | * | 9/2009 | Okano | 250/239 |
| 2002/0113244 | A1 | * | 8/2002 | Barnett et al. | 257/98 |
| 2005/0068773 | A1 | * | 3/2005 | Ng et al. | 362/253 |
| 2006/0016970 | A1 | * | 1/2006 | Nagasaka et al. | 250/231.13 |
| 2006/0208181 | A1 | * | 9/2006 | Takahashi | 250/239 |
| 2006/0220049 | A1 | * | 10/2006 | Flaherty et al. | 257/98 |
| 2006/0226349 | A1 | * | 10/2006 | Okada et al. | 250/231.13 |
| 2008/0054170 | A1 | * | 3/2008 | Okano | 250/231.14 |
| 2008/0123198 | A1 | * | 5/2008 | Fujita | 359/709 |
| 2010/0123071 | A1 | * | 5/2010 | Lin et al. | 250/229 |
| 2010/0224801 | A1 | * | 9/2010 | Wang et al. | 250/551 |

FOREIGN PATENT DOCUMENTS

| | | |
|---|---|---|
| CN | 2861973 | 1/2007 |
| CN | 101256088 | 9/2008 |
| JP | 3-124292 | 5/1991 |
| JP | 6-137897 | 5/1994 |
| JP | 59-147204 | 8/1994 |
| JP | 11-271097 | 10/1999 |

* cited by examiner

*Primary Examiner* — John Lee
(74) *Attorney, Agent, or Firm* — Muncy, Geissler, Olds & Lowe, PLLC

(57) ABSTRACT

A transmissive optical encoder comprises a base, a first leadframe, a second leadframe, an optical emitter, a shielding portion, an optical receiver, and a lens. The base has a first housing and a second housing. The first leadframe and the second leadframe are respectively disposed in the first housing and the second housing. The optical emitter for emitting a light is disposed in the first housing and coupled to the first leadframe. The shielding portion is extended from the first leadframe being bent to cover the optical emitter and exposes the optical emitter by an opening formed thereon. The optical receiver for receiving the light is disposed in the second housing and coupled to the second leadframe. The lens is disposed on the first housing for rendering the light passing through the opening to the optical receiver.

7 Claims, 2 Drawing Sheets

TRANSMISSIVE OPTICAL ENCODER

RELATED APPLICATIONS

This application claims priority to Taiwan Application Serial Number 97144691, filed Nov. 19, 2008, which is herein incorporated by reference.

BACKGROUND

1. Field of Invention

The present invention relates to an optical encoder. More particularly, the present invention relates to a transmissive optical encoder.

2. Description of Related Art

A conventional transmissive optical encoder uses an external single slit element and a lens between an optical emitter and an optical sensor to produce parallel light. FIG. 1 is a sectional view of a transmissive optical encoder according to a prior art. The transmissive optical encoder 100 has a base 110, an optical emitter 120, an optical sensor 130, a single slit element 140 and a convex lens 150.

The base 110 is a hollow casing made of an opaque substance. The base 110 has an indentation 112, several orientation elements 114, and a track 116 between two orientation elements 114.

The optical emitter 120 is on one side of the indentation 112 and the optical sensor 130 is on the other side of the indentation 112. The optical sensor 130 is set in one of track 116. And the optical emitter 120 is opposite to the optical sensor 130.

The single slit element 140 is set on the optical emitter 120 and has an opening 142 facing to the optical emitter 120. The convex lens 150 is set on the single slit element 140 and is orientated on the optical emitter 120 by an orientation part 152.

In order to limit the light emitted from the optical emitter 120, the single slit element 140 of the transmissive optical encoder 100 is set between the optical emitter 120 and the convex lens 150. Therefore, the light emitted by the optical emitter 120 passes through the opening 142 of the single slit element 140 and the convex lens 150 to the optical sensor 130. The optical sensor can receive uniform light intensity from the light source. However, the external single slit element increases the assembling difficulty and the needed materials of the transmissive optical encoder, and thus the production cost.

SUMMARY

The present invention provides a transmissive optical encoder comprising a base, a first leadframe, a second leadframe, an optical emitter, a shielding portion, an optical receiver, and a lens. The base has a first housing and a second housing. The first leadframe and the second leadframe are respectively disposed in the first housing and the second housing. The optical emitter for emitting a light is disposed in the first housing and coupled to the first leadframe. The shielding portion is extended from the first leadframe being bent to cover the optical emitter and exposes the optical emitter by an opening formed thereon. The optical receiver for receiving the light is disposed in the second housing and coupled to the second leadframe. The lens is disposed on the first housing for rendering the light passing through the opening to the optical receiver.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
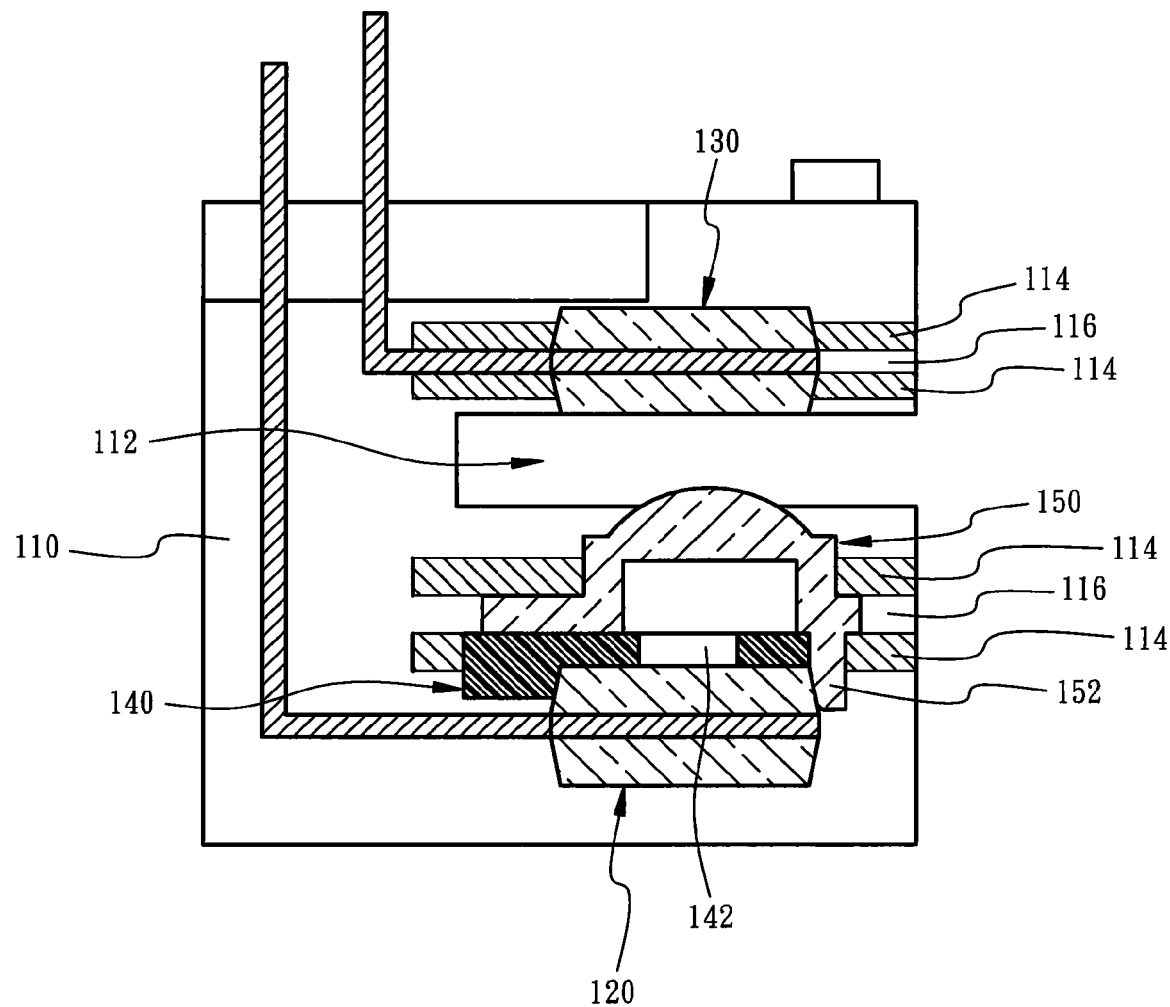
FIG. 1 is a sectional view of a transmissive optical encoder according to a prior art.

Reference will now be made in detail to the present embodiments of the invention, examples of which are illustrated in the accompanying drawings. Wherever possible, the same reference numbers are used in the drawings and the description to refer to the same or like parts.

Figure 2:
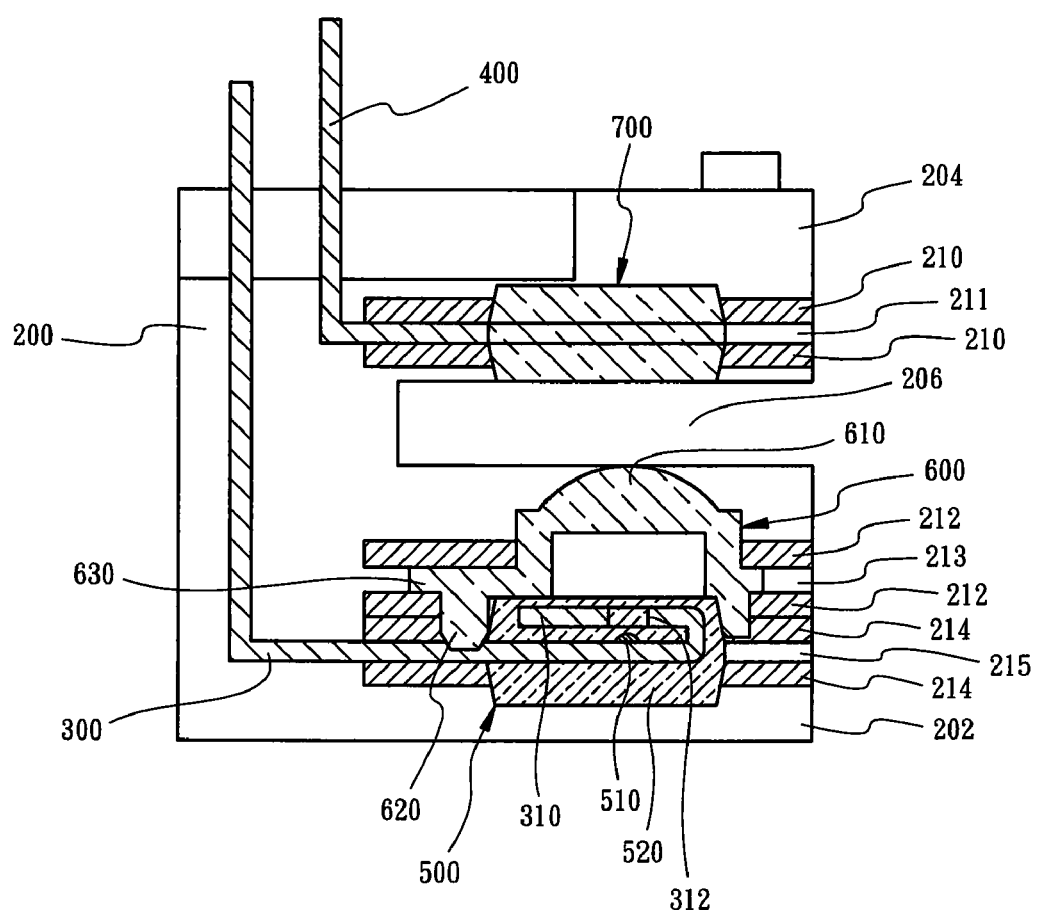
FIG. 2 is a sectional view of a transmissive optical encoder according to one embodiment of this invention.

FIG. 2 is a sectional view of a transmissive optical encoder according to one embodiment of this invention. The transmissive optical encoder has a base 200, a first leadframe 300, a second leadframe 400, an optical emitter 500, a convex lens 600 and an optical receiver 700.

The base 200 is a hollow casing made of an opaque substance. The base 200 has a first housing 202, a second housing 204 and a notch 206 located between the first housing 202 and the second housing 204. In other words, the first housing 202 and the second housing 204 are oppositely disposed with a distance.

The base 200 also has three pairs of ribs 210, 212, 214, and three tracks 211, 213, 215 respectively defined by the three pairs of the ribs 210, 212, 214. The pair of ribs 210 is in the second housing 204 of the base 200, and the other two pairs of ribs 212, 214 are in the first housing 202 of the base 200.

The first leadframe 300 is disposed in the first housing 202, and the second leadframe 400 is disposed in the second housing 204. The optical emitter 500 for emitting the light is disposed in the first housing 202 and coupled to the first leadframe 300. In detail, the optical emitter 500 is coupled to the track 215 in the first housing 202 of the base 200.

Figure 3:
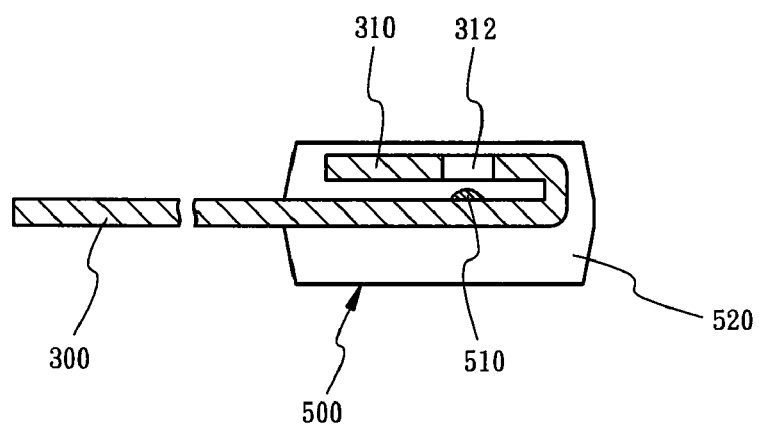
FIG. 3 is a sectional view of the optical emitter coupled with the first leadframe of FIG. 2.

FIG. 3 is a sectional view of the optical emitter 500 coupled with the first leadframe 300 of FIG. 2. According to an embodiment, the optical emitter 500 has a light-emitting diode (LED) 510 enclosed by a light-transmitting material 520. The first leadframe 300 is used to support the optical emitter 500 by inserting into the light-transmitting material 520.

As shown in FIG. 3, a shielding portion 310 is extended from the first leadframe 300 and is bent to cover the optical emitter 500. An opening 312 is formed on the shielding portion for exposing the optical emitter 500. Hence, the light emitted from the optical emitter 500 passes through the opening 312 of the shielding portion 310 to reach the optical receiver 700. The shielding portion 310 is above the first leadframe 300 and substantially parallel to the first leadframe 300 to form an internal single slit element. The LED 510 is located on the first leadframe 300 and right under the opening 312.

The convex lens 600 is located on the first housing 202 of the base 200 and right on the optical emitter 500. The convex lens 600 has a transmission part 610, a plug 620 and an insertion part 630. The convex surface of the transmission part 610 faces to the optical receiver 700. The plug 620 is used to plug onto the first leadframe 300 to fasten the lens 600 onto the optical emitter 500 so that the light emitted from the optical emitter 500 passes through the transmission part 610 of the lens 600 to the optical receiver 700. In detail, the insertion part 630 is inserted into the track 213 to install the convex lens 600 on the optical emitter 500.

The optical receiver 700 for receiving the light is disposed in the second housing 204 and coupled to the second leadframe 500. In detail, the optical receiver 700 is coupled to the track 211 in the second housing 204 of the base 200 and exposed to the notch 206. The optical receiver 700 has several optical detection chips (not shown) inside. The optical detection chips have photo diode integrated circuit (PDIC), for example.

Accordingly, the light emitted from the LED 510 sequentially passes through the opening 312, the transmission part 610 of the convex lens 600, and the notch 206 of the base 200 and finally reaches the optical receiver 700 to form a optical communication between the optical emitter 500 and the optical receiver 700.

An external single slit element can be omitted here, since the transmissive optical encoder disclosed above integrates the single slit into the optical emitter by utilizing the shielding portion extending from the first leadframe to form an internal single slit element. Therefore, the assembling procedure of the transmissive optical encoder disclosed above can be easier with less steps; the needed material can also be decreased and thus the production cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A transmissive optical encoder comprising:
   an opaque base having a first housing and a second housing oppositely disposed;
   an optical emitter having a light-emitting diode (LED) for emitting a light and disposed in the first housing;
   an optical receiver for receiving the light and disposed in the second housing; and
   a first leadframe and a second leadframe respectively coupled to the optical emitter and the optical receiver;
   wherein the first leadframe comprises a shielding portion extended from an end of the first leadframe and bent to cover the LED, and the shielding portion is substantially parallel to the first leadframe and comprises a slit, through which the light reach the optical receiver.

2. The transmissive optical encoder of claim 1, further comprising a lens disposed on the first housing for rendering the light passing through the slit to the optical receiver, wherein the lens comprises an inserted portion, a plug protruding from a surface of the inserted portion, and a transmission part connected to the inserted portion.

3. The transmissive optical encoder of claim 2, wherein a convex surface of the lens faces to the optical receiver, the insertion part is inserted into the first housing to install the lens on the optical emitter, and the plug is inserted into the first leadframe to fasten the lens onto the optical emitter so that the light emitted from the optical emitter passes through the transmission part of the lens to the optical receiver.

4. The transmissive optical encoder of claim 1, further comprising a light-transmission material enclosing the optical emitter.

5. The transmissive optical encoder of claim 1, further comprising a plurality of ribs disposed on the first housing and the second housing of the opaque base, wherein the lens is inserted between at least two ribs to install the lens on the optical emitter.

6. The transmissive optical encoder of claim 1, wherein the optical receiver comprises a plurality of optical detection chips.

7. The transmissive optical encoder of claim 6, wherein the optical detection chip has a photo diode integrated circuit.

* * * * *